April 26, 1966 J. W. WEIGL 3,248,216
PROCESS AND APPARATUS FOR HALF-TONE ELECTROPHOTOGRAPHY
Filed March 28, 1961 4 Sheets-Sheet 1

MATERIAL-UNCHARGED

NEGATIVE CHARGE APPLIED

AFTER GRAVURE ROLLER

HALFTONE EXPOSURE TO LIGHT

DEVELOPED (TONER APPLIED)

INVENTOR.
JOHN W. WEIGL
BY Henry W. Coughlin
Edward P. Gilheany
ATTORNEYS

April 26, 1966  J. W. WEIGL  3,248,216
PROCESS AND APPARATUS FOR HALF-TONE ELECTROPHOTOGRAPHY
Filed March 28, 1961  4 Sheets-Sheet 2

ELECTROSTATIC SURFACE
CHARGE BEING LAID DOWN
BY ARRAY OF CORONA NEEDLES

GROUNDED GRAVURE ROLLER
REMOVING SOME CHARGE
LEAVING A DOT PATTERN

INVENTOR.
JOHN W. WEIGL
BY Henry W. Coughlin
Edward P. Gilhany
ATTORNEYS

April 26, 1966     J. W. WEIGL     3,248,216
PROCESS AND APPARATUS FOR HALF-TONE ELECTROPHOTOGRAPHY
Filed March 28, 1961     4 Sheets-Sheet 3

*INVENTOR.*
JOHN W. WEIGL
BY Henry W. Coughlin
Edward P. Gilham
ATTORNEYS

April 26, 1966  J. W. WEIGL  3,248,216
PROCESS AND APPARATUS FOR HALF-TONE ELECTROPHOTOGRAPHY
Filed March 28, 1961  4 Sheets-Sheet 4

INVENTOR.
JOHN W. WEIGL
BY Henry W. Coughlin
Edward P. Gilhooly
ATTORNEYS 3,248,216
PROCESS AND APPARATUS FOR HALF-TONE
ELECTROPHOTOGRAPHY
John W. Weigl, Binghamton, N.Y., assignor to General Aniline & Film Corporation, New York, N.Y., a corporation of Delaware
Filed Mar. 28, 1961, Ser. No. 98,950
5 Claims. (Cl. 96—1)

This invention relates to electrophotography and, more particularly, to a process and apparatus for controlling the tone and reducing contrast of images produced by the electrophotographic process.

The electrophotographic process of producing images is now well known. It is described, for example, in United States Patent 2,297,691 to Chester F. Carlson. Briefly, the process comprises producing a sheet comprising a base or support, which may be paper or plastic film, provided if desired with a layer of a conducting material such as aluminum foil, for example, which layer is in turn coated with a layer of photoconductive insulating material such as zinc oxide, selenium, and the like, in an insulating resinous binder. Alternatively, the conducting layer may be omitted as in German patent application 1,030,183 or United States Patent 2,922,883. The sheet is "sensitized" in the absence of actinic radiation by the application of a uniform surface charge to the photoconductor. It is then exposed by actinic radiation to a pattern to be recorded. Wherever the photoconductor is illuminated, the surface charge leaks away through the base so that a charge density pattern is formed in substantial conformity with the light radiation pattern. The electrostatic latent image may then be rendered visible by the application of electrically charged powder particles to the photoconductor— as a mist, as liquid suspensions or as adsorbates on iron powder, glass beads or the like. The developer powder is generally chosen to be dark so as to contrast with the normally light-colored photoconductive sheet. The powder may then be transferred imagewise to a receiving sheet and affixed thereto, or it may be directly fused to the photoconductive sheet. While this process is fairly satisfactory for the reproduction of line copy, it yields images too contrasty for the satisfactory rendition of continuous-tone originals.

A number of methods have been described for reducing this excessive contrast. For example, Walkup United States Patent 2,784,109, issued March 5, 1957, has described the use of bias electrodes in the developing chamber. These are used to control the response of toner to the electrostatic latent image by variation of an externally applied field. This approach suffers from the requirement for somewhat complex development electrodes and for a separate bias voltage supply.

Jarvis, Smith and Tyler French Patent 1,210,685,, issued October 3, 1960, suggests that multilayer or mosaic coatings containing discrete areas of photoconductors of different sensitivities exhibit an over-all gain in apparent sensitometric range. However, such coatings are relatively difficult and expensive to produce.

The most universally useful means of improving tone control in a contrasty photographic process is to cover the original to be copied with a screen bearing a fine dot pattern having 30–70% over-all open area. This screen is mounted far enough from the original to allow penumbra and diffraction effects to "soften" the shadows cast by the edges of the dot. Alternatively, specially prepared photographic "contact screens" are used in contact with the original. In this type of screen, the density of each dot varies continuously between the center and the outer edge of each dot. Such screens serve to project a dot pattern upon the photosensitive sheet in such a way as to cause maximum size dots to project from dark areas and progressively smaller dots from brighter areas. The result of this well-known "half-tone" process is to give a substantial exposure latitude to even highly contrasty processes such as photolithography, diazo-type and electrostatic electrophotography. While optical screening by these methods is satisfactory for contrast and 1:1 projection printing, it is a tricky and cumbersome process at best. In any event, it is practically impossible to apply screens to microfilm originals such as 35 millimeter black and white films or color slides because the fine detail recorded in such originals would require dot screens having spacings of the order of 0.5 micron. Such spacings are so small as to be comparable to a wave length of light, and well-known diffraction effects would therefore destroy the pattern if it were projected in an enlarger.

In enlarging microfilm images by projection upon electrophotographic sheets, it is desirable to produce a screen pattern by some suitable operation on the conveniently large copy sheet rather than on the microfilm original. One possible way to accomplish this to lay a properly spaced screen pattern over the copy sheet instead of over the original. This procedure has the drawback that it requires either a rather intricate mounting and spacing arrangement to separate screen and copy sheet, or else a direct contact of the screen material with the charged photoconductive surface. The latter procedure leads to partial or irregular charge transfer from copy sheet to screen and is highly detrimental to good image formation.

Two practical ways to form screened images upon electro photographic sheets have been discussed in the prior art: The first method requires "flashing" the copy sheet, just prior to or just following image projection, with a dot pattern projected from or through a suitable dot pattern screen. This process has the shortcomings that either an expensive separate projector for the screen projection must be used or the image bearing original in the projector must be replaced with a dot screen original, thus losing the fixed registration of image and copy sheet which is highly desirable for rapid multicolor printing by repeated exposure and development. In order to overcome these shortcomings, it has been suggested to apply a dot charge pattern by charging the photoconductor through a grounded fine metallic screen. In theory, this screen should permit the charge to penetrate through the holes so as to form a fine pattern of light-sensitive dots. Unfortunately, this process works only with relatively coarse screens of the order of 25 dots per inch, for if it is attempted to go to screens of the order of 100–250 dots per inch, which are required for good reproduction of image detail, the screen acts as an effective electrostatic shield and the charge penetrates unevenly and inadequately. A further drawback of this use of an electrically masked screen is that it is difficult to keep a fine unsupported screen sufficiently flat to maintain an even spacing between it and the copy sheet and, therefore, to maintain uniform dot-wise penetration of the charge.

In view of the shortcomings of the various processes of the prior art, it, therefore, appears eminently desirable to provide a practical, new, non-optical process for the projection reproduction of continuous-tone originals as half-tone prints.

It is, accordingly, an object of this invention to provide a novel process and apparatus for the projection reproduction of continuous-tone originals as half-tone prints by the electrostatic-photographic process.

It is a further object of this invention to provide a process for the projection reproduction of continuous-tone originals as half-tone prints by electrostatic-photography, which process is simple, requires no special optical devices and is adaptable both to single-exposure, monochrome and multiple-exposure, multicolor printing, as well as to the reproduction of electrolithographic masters.

It is a still further object of this invention to provide a novel process and apparatus for applying a screened charge pattern directly to a previously uncharged photoconductive insulating surface without the use of the usual screens.

Other objects and advantages of this invention will appear to those skilled in the art from the detailed description thereof given below and illustrated in the accompanying drawing.

Briefly, the novel process comprises placing a uniform electrostatic charge on the photoconductive insulating surface of an electrophotographic sheet; contacting the charged surface with a grounded conductive element having projections thereon, such as a gravure roller, for example whereby the projections come in contact with spaced portions of the charged surface; and removing the charges from said portions, leaving the remainder of the surface in charged condition, thereby producing a latent image dot pattern. The charge dots are reduced in size by subsequent illumination through a pattern. This increases the surface conductivity and thereby allows some of the charge to be dissipated from the dots to the surrounding uncharged areas and thence to the conductive backing of the sheet. The sensitometric effect of the positive-working, half-tone system is achieved by causing dot size to vary more or less inversely with exposure.

The same result may also be achieved albeit in not quite as satisfactory a manner by incorporating the step of contacting the surface of the photoconductor with the grounded conductive element after rather than before exposing the said surface under the pattern. In this case, a short time interval, say of several seconds, is allowed to pass after application of the grounded conductive element to allow the retained charge to spread over the surface of the photoconductor.

FIGS. 1 to 13 of the drawing illustrate the condition of the electrophotographic sheet during various steps of applicant's novel process.

FIG. 14 depicts the placing of a uniform electrostatic charge on the surface of an electrophotographic sheet.

FIG. 15 depicts the rolling of a grounded gravure roller in contact with the charged surface of the sheet.

FIG. 16 depicts the exposure of the sheet under a pattern to a light source.

FIG. 17 depicts the step of developing the sheet after exposure.

Figure 1:
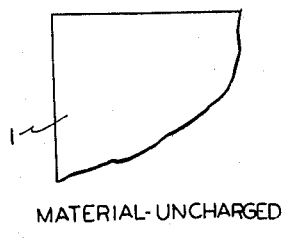
FIG. 1 is a top plan view of a portion of the sheet in its uncharged condition.

Referring to FIGS. 1 to 17 of the drawing which illustrate applicant's invention, 1 designates an electrophotographic element or sheet. This element comprises a flexible base 2 of paper, plastic film or the like to which is laminated a thin conductive layer 3 which may be aluminum foil or the like, the latter being overcoated with a photoconductive insulating layer 4 which may be of the usual type such as zinc oxide, selenium, etc. dispersed in an insulating resinous binder such as described in United States Patent 2,663,636 or 2,907,674.

Figure 3:
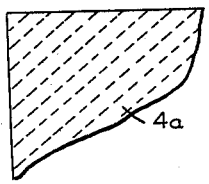
FIG. 3 is a top plan view of the same sheet after a uniform negative electrostatic charge has been placed on the photoconductive insulating surface thereof, the invisible electrical charges being schematically depicted by a dot pattern.
Figure 4:
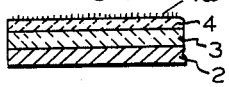
FIG. 4 is a cross-section of the sheet of FIG. 3.
Figure 14:
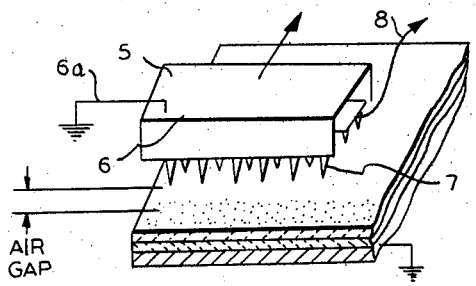
FIGS. 14–17 illustrate diagrammatically the various steps of applicant's novel process.

The processing of this electrophotographic element follows conventional procedure excepting for the interpolation between (a) the steps of charging the element and discharging under an original by actinic light, or (b) the steps of discharging under an original by actinic light and toning of the critical feature embodying a local or pattern-wise dissipation of the charge according to a predetermined dot pattern or design. Thus, in the preferred method, the surface of layer 4 of element 1 is uniformly charged by a suitable means such as a corona discharge device 5 shown in FIG. 14. Said device comprises a holder 6 grounded at 6a and provided with an array of corona discharge needles 7. These needles are connected at 8 to a source of high negative potential which sprays a charge through air gap 9 onto the surface of layer 4. Layer 3 is grounded at 6b and the potential selected may be as high as 10,000 volts relative to layer 3. The alteration 4a in layer 4 by charging as in FIG. 14 is illustrated in FIGS. 3 and 4 and graphically in FIG. 5.

Figure 6:
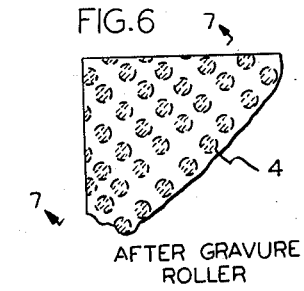
FIG. 6 is a top plan view of the sheet of FIG. 3 after a grounded gravure roller has been rolled over the charged surface.
Figure 2:
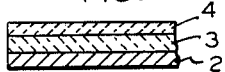
FIG. 2 is cross-section of the sheet of FIG. 1.
Figure 7:
FIG. 7 is a cross-section on line 7—7, FIG. 6.
Figure 5:
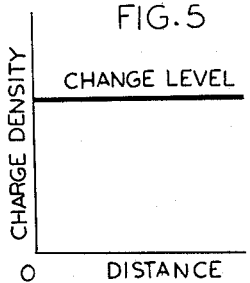
FIG. 5 is a graph depicting the uniform electrical charge on the surface of the sheet of FIG. 3.
Figure 8:
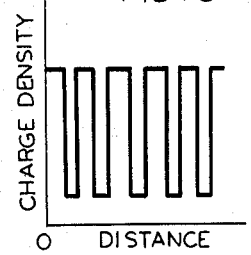
FIG. 8 is a graph depicting the density of the charge on the surface of the sheet of FIG. 6.
Figure 15:
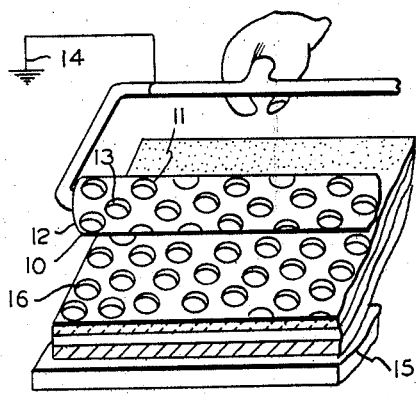

The critical step of my invention is shown in FIG. 15 and involves the partial dissipation of the charge on the surface 4 of element 1 by contacting said surface with a conductive or semi-conductive element such as a metallic gravure roller 10 having a dot pattern 11 provided by ridges or projections 12 and recesses 13, said roller being grounded at 14. Preferably, element 1 is located on a compressible support 15, such as rubber, to assure positive contact between the roller 10 and surface 4. Wherever the metallic ridges 12 of roller 10 contact the charged surface of layer 4, the charge is drawn off to ground, leaving on the layer 4 a residual dot pattern charge 16 confronting in shape, size and spacing to the dot-shaped recesses 13 of roller 10. The spaced charge pattern is shown in FIGS. 6 and 7 and the density of the charge is graphically shown in FIG. 8.

Figure 11:
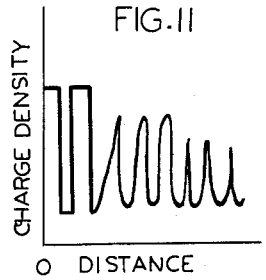
FIG. 11 is a graph depicting the density of the charge on the surface of the sheet of FIG. 9.
Figure 9:
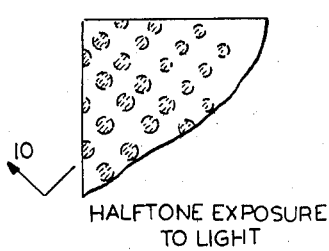
FIG. 9 is a top plan view of the sheet of FIG. 6 after exposure to light through a pattern.
Figure 12:
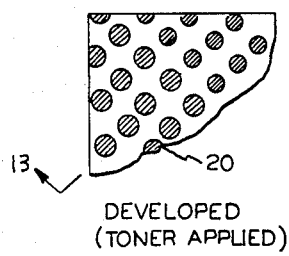
FIG. 12 is a top view of the exposed sheet of FIG. 9 after being developed with a toner.
Figure 10:
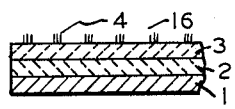
FIG. 10 is a cross-section of the sheet on line 10—10, FIG. 9.
Figure 13:
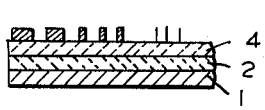
FIG. 13 is a cross-section of the sheet on line 13—13, FIG. 12 (the thickness of the toner layer being exaggerated for clarity).
Figure 16:
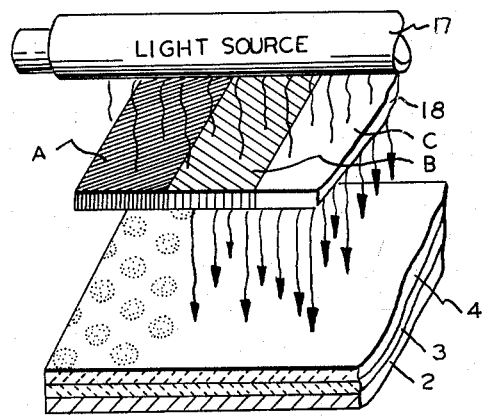
Figure 17:
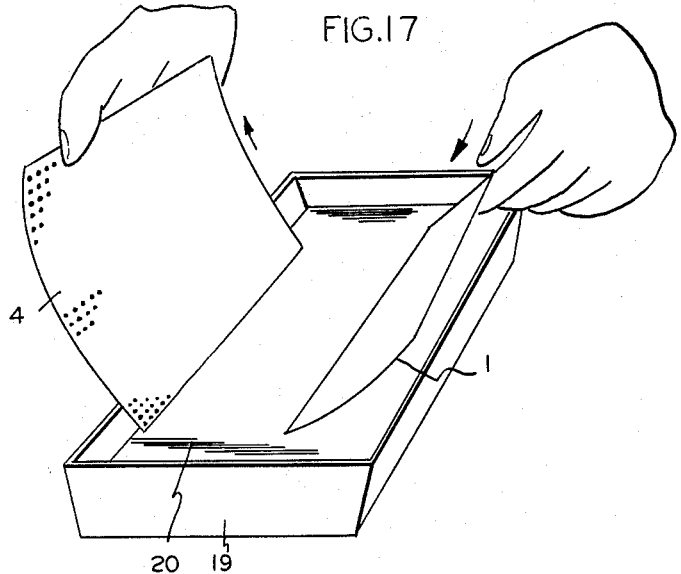

The electrophotographic element 1 after treatment with the gravure roller is next exposed to a source of light 17 under an original 18, as shown schematically in FIG. 16, to produce the latent image of the original. As shown in this figure, the original is a step wedge with three areas of variable densities A, B and C. The area A is of the greatest density and transmits the least amount of actinic light, area B is of intermediate density and transmits an intermediate amount of light, while area C is of least density and transmits the greatest amount of light to the electrophotographic element 1. The corresponding areas on element 1 are designated as A', B' and C'. By comparing the charge pattern of FIGS. 15 and 16, it will be seen that the dots of the charge pattern of FIG. 15 are shrunken in size by the actinic illumination and that the most brightly illuminated area C' retains the smallest latent image dots after exposure while the area A' retains the largest latent image dots. The area B' retains dots intermediate in size between those of area A' and area C'. The configuration of the charge after exposure is also shown in FIGS. 9, 10 and 11.

After exposure, the latent image on the electrophotographic sheet 1 is developed. For purposes of illustration, I have shown in FIG. 17 liquid development involving a pan 19 containing a liquid developer or toner 20 containing positively charged electroscopic toner particles and, in this connection, reference is made to the liquid developement described in United States Patent 2,907,674. The sheet 1 is manually immersed in the liquid developer and the positively charged particles adhere to the negatively charged dots on sheet 1, thereby producing a visible powder image. This image may be fused, if desired, to insure permanence.

Figure 18:
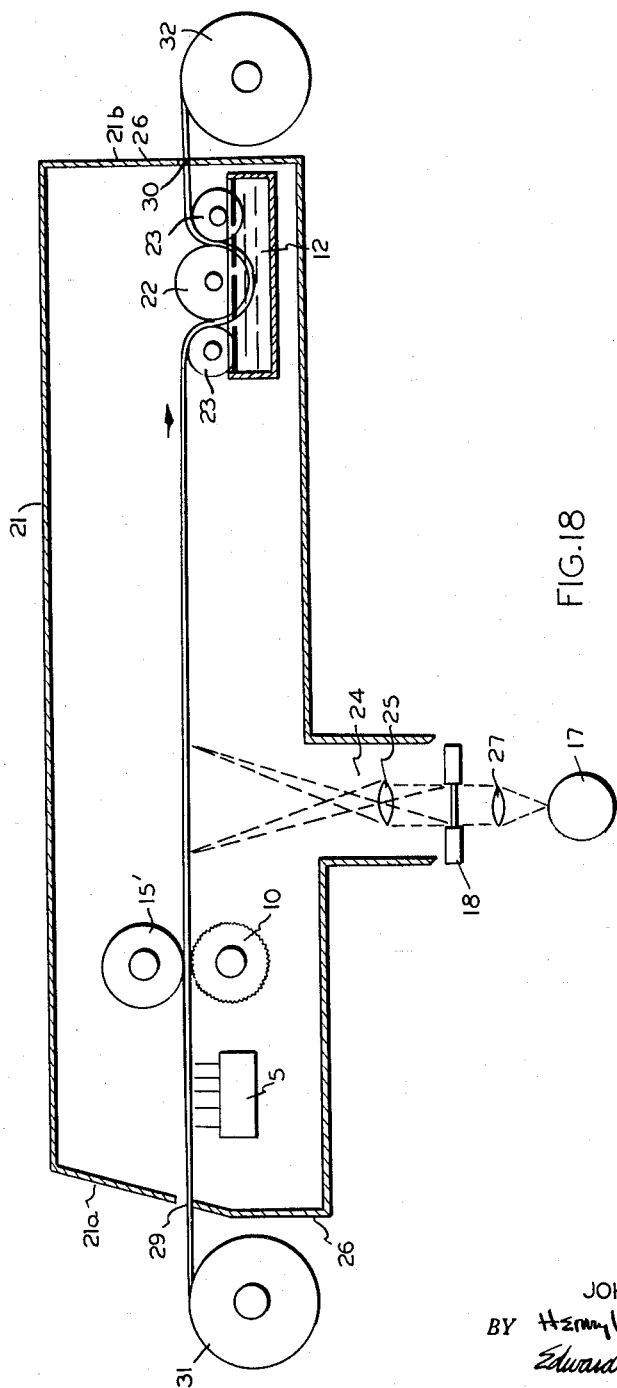
FIG. 18 is a schematic view of one form of an apparatus that may be used for practicing the novel process.

In FIG. 18, there is schematically shown an apparatus for carrying out the process more or less automatically. A casing 21 houses the corona charging unit 5, the gravure roller 7 and a compressible backing roller 15', which may be rubber covered, all positioned adjacent one end 21a of the casing. Housed in the casing adjacent the other end 21b thereof is the developing apparatus comprising the pan 11 containing the toner 12, a roller 22 partly immersed in the toner, which may be either a powder or a liquid having toner particles dispersed therein, and two guide rollers 23, one positioned on each side of the roller 22. The casing 21, intermediate the ends thereof, is provided with an aperture 24. This aperture is positioned closed to the gravure roller 10 than to the developing apparatus and in it is located the original 18 to be copied. Positioned outside the casing 21 in alignment with the original is the light source 17 and a lens 27 to focus the the rays emanating from the light source on the original. Another lens 25 is positioned within the casing in alignment with the original to project the rays passing through the original onto the sheet or web 1.

The end walls 26 of the casing are provided with slots 29 and 30 for the passage of the sheet 1 into and out of the casing respectively. Feed roller 31 and takeup roller 32 are positioned outside of casing 13 adjacent slots 19 and 20 respectively.

In operation, the sheet 1 from roller 31 is drawn through slot 29 into the casing and finally through slot 30 onto takeup roller 32. In passing through the casing, the photoconductive insulating layer 4 of sheet 1 is first uniformly charged by the corona discharge device 5 and then contacted by gravure roller 10 which removes the charge from spaced areas of the layer in conformity with the pattern of ridges on the roller. The sheet 1 is backed by roller 15 while the roller 7 is in contact with the sheet. The sheet then moves past opening 24 where it is exposed as already described. The exposed sheet then passes over the first roller 23, around roller 22, immersed in the toner and over the other roller 15, whereby the latent image on the sheet is developed and made visible. The sheet is then passed through slot 30 and taken up on roller 32.

At least one-half and preferably five to ten seconds should be allowed to elapse between the beginning of actinic exposure and the beginning of development so that sufficient surface migration of charge may occur to reduce the size of the dots in illuminated areas. For this reason, the exposure station in the device shown, is placed close to the rotogravure roller and a long section of the sheet 1 is provided between the exposure station and the development station. However, any other desired manner of accomplishing this result, such as, for example, providing a longer casing, may be resorted to.

While I have described the electrical screening process of this invention merely in its application to the production of monochrome half-tone prints, it is applicable, par excellence, to the production of multicolor prints from color transparencies or color separation positives. It will be clear to those skilled in the art that one needs merely to go through the process repeatedly, once for each color, matching color filters to the colors of the toners used. In this connection, it is advantageous each time to use different gravure patterns and/or to roll the patterns over the sheet at different angles relative to the image in order to randomize the dot pattern produced for the several colors. Alternatively, it is possible to apply successive dot patterns in closely controlled mechanical registration so as to minimize overlap of dots of successive colors.

Modifications of this invention will occur to persons skilled in the art. Thus, while I have described liquid development, it is apparent that development by powder or a mist or cloud may be resorted to. Similarly, while I had mentioned application of the dot pattern by resort to metallic roller, rollers of semi-conducting materials such as of carbon-loaded rubber or resin may also be used. As long as the material of the roller has a resistivity to ground less than that of the photoconductor (a volume resistivity less than $10^{10}$ ohms cm.), it will be satisfactory. The term "conductive" should be construed accordingly. I, therefore, do not intend to be limited in the patent granted except as necessitated by the appended claims.

I claim:

1. A process of electrophotography which comprises uniformly electrostatically charging the surface of a layer of photoconductive insulating material superposed on an electrically conductive layer, mechanically removing the charge from certain areas only of said surface by rolling contact with a separate electrically conductive grounded element having a dot pattern of contact means on an electrically conductive, cylindrical surface thereof, leaving the charge on other areas of said surface in a pattern corresponding to the negative of the said dot pattern of the contact means, thereafter exposing said surface to light passing through an image whereby a half-tone patterned latent image is produced on said surface and developing said latent image to render it visible.

2. A process as recited in claim 1 wherein the surface of the layer of photoconductive insulating material is negatively charged and wherein the latent image is developed by placing a positively charged toner powder on said surface.

3. A process as recited in claim 2 wherein the positively charged powder is in suspension in a liquid.

4. A process of electrophotography which comprises uniformly electrostatically charging the surface of a layer of photoconductive insulating material superposed on an electrically conductive layer, mechanically removing the charge from certain areas of said surface by rolling an electrically conductive grounded roller having a dot pattern of electrically conductive spaced projections thereon over said surface with the projections in contact with said surface while leaving the charge on other uncontacted areas of said surface, thereafter exposing said surface to light passing through a visible image whereby residual charged areas of said surface are selectively and diffently discharged in accordance with their degree of exposure to leave a half-tone patterned latent image on said surface and developing such latent image to render it visible.

5. An apparatus suitable for use in electrophotography comprising a housing, electrostatic charging means within the housing, an electrically conductive gravure roller positioned within the housing and electrically connected to ground, exposure means cooperating with said housing to project light imagewise into the said housing, developing means within the housing and means for moving an electrophotographic sheet through the housing first past said charging means, with the photoconductive surface of said sheet exposed to said charging means; then past said gravure roller in mechanical, rolling contact with the pattern of said roller; then past said exposure means and finally through said developing means and out of said housing.

(References on following page)

References Cited by the Examiner

UNITED STATES PATENTS

| | | | |
|---|---|---|---|
| 2,598,732 | 6/1952 | Walkup | 96—1 |
| 2,701,199 | 2/1955 | Damschroder et al. | 96—79 |
| 2,808,328 | 10/1957 | Jacob | 96—1 |
| 2,811,465 | 10/1957 | Grieg | 96—1 |
| 2,845,348 | 7/1958 | Kallman | 96—1 |
| 2,907,674 | 10/1959 | Metcalfe | 96—1 |
| 3,005,707 | 10/1961 | Kallman et al. | 96—1 |
| 3,051,568 | 8/1962 | Kaprelian | 96—1 |
| 3,121,010 | 2/1964 | Johnson et al. | 96—45 |

NORMAN G. TORCHIN, *Primary Examiner.*

PHILIP E. MANGAN, *Examiner.*